(12) United States Patent
Bell et al.

(10) Patent No.: US 6,239,233 B1
(45) Date of Patent: *May 29, 2001

(54) POLYESTER/POLYAMIDE BLENDS WITH IMPROVED COLOR

(75) Inventors: Emily Tedrow Bell, Jonesborough; James Rodney Bradley; Timothy Edward Long, both of Kingsport; Steven Lee Stafford, Gray, all of TN (US)

(73) Assignee: Eastman Chemical Company, Kingsport, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,595

(22) Filed: Oct. 9, 1998

(51) Int. Cl.⁷ .................................................. C08L 67/02
(52) U.S. Cl. ............................................ 525/425; 525/432
(58) Field of Search ................................................. 525/425

(56) References Cited

U.S. PATENT DOCUMENTS

| | | |
|---|---|---|
| 3,843,479 | 10/1974 | Matsunami et al. . |
| 3,946,089 | 3/1976 | Furukawa et al. . |
| 4,133,802 | 1/1979 | Hachiboshi et al. . |
| 4,837,115 * | 6/1989 | Igarashi et al. ..................... 525/425 |
| 5,258,233 | 11/1993 | Mills et al. . |
| 5,266,233 | 11/1993 | Houghton et al. . |
| 5,340,884 | 8/1994 | Mills et al. . |
| 5,650,469 | 7/1997 | Long et al. . |

FOREIGN PATENT DOCUMENTS

| | | |
|---|---|---|
| 0285693 | 10/1988 | (EP) . |
| 50-5735 | 3/1975 | (JP) . |
| 50-10196 | 4/1975 | (JP) . |
| 4028761 | 1/1992 | (JP) . |
| WO 93/20147 | 10/1993 | (WO) . |
| WO 98/39388 | 9/1998 | (WO) . |

* cited by examiner

Primary Examiner—Patricia A. Short
(74) Attorney, Agent, or Firm—Karen A. Harding; Harry J. Gwinnell (57) ABSTRACT

The present invention involves the preparation and use of polyester blend containing at least one acid terminated polyamide which give the improved color as compared to the prior art. The present invention comprises polyester blend composition having improved color comprising:

(A) about 99.98 to about 95 weight percent of a polyester which comprises
  (1) a dicarboxylic acid component comprising repeat units from at least 85 mole percent terephthalic acid, and
  (2) a diol component repeat units from at least 85 mole percent ethylene glycol, based on 100 mole percent dicarboxlic acid and 100 mole percent diol; and (B) acid terminated polyamide.

23 Claims, 4 Drawing Sheets

POLYESTER/POLYAMIDE BLENDS WITH IMPROVED COLOR

FIELD OF THE INVENTION

This invention relates generally to a formulation of polyester with polyamides. More particularly, the present invention relates to polyester blended with critical amount of polyamide that contains acid functional end groups to improve the color of polyester blends.

BACKGROUND OF THE INVENTION

The container market for bottled water requires not only low levels of acetaldehyde (AA) in the container sidewall but also minimal color. AA is an inherent byproduct which is generated during the polymerization melt phase and subsequent processing steps, and is known to diffuse into the packaged contents leading to an undesirable taste. The amount of residual AA can also be influenced by variables such as catalyst selection in the polymer synthesis. Prior art has demonstrated that blending low levels of polyamide having terminal amino groups with the poly(ethylene terephthalate), PET, can significantly reduce the amount of AA.

In addition to very low levels of residual AA, the industry also demands that the product color be as low as possible. The clarity and bottle sidewall color permits the use of "natural" or colorless water bottles, and also facilitates the intentional addition of dyes to generate desired color bottles.

In spite of significant improvement in reducing the amount of AA available to desorb into the package content, the solution currently available addresses only a part of the problem. The color of the polyester/polyamide blend is still unsatisfactory, particularly when higher amounts of polyamide are required. In fact, bottles produced with a commercial concentrate blended with PET have a yellowish color, which fades with time. The polyamide currently employed in such blends contains a high level of terminal amino groups, which adversely affect the color of the polyester blend.

U.S. Pat. No. 5,258,233 discloses the use of a low molecular weight polyamide/PET blend to reduce acetaldehyde. The patent discloses that less than 2.0 weight percent of the polyamide should be used to minimize color and haze. However even at 0.5 weight percent, undesirable levels of color can be generated.

Similarly, U.S. Pat. No. 5,266,233 discloses that low molecular weight polyamide/PET copolyesters blend reduces acetaldehyde. Again, it is emphasized that 0.05 to 2.0 weight percent of the polyamide be used to effectively reduce acetaldehyde while maintaining color and clarity. However, undesirable levels of color can be generated even when 0.5 weight percent polyamide is blended with PET copolyesters.

U.S. Pat. No. 5,340,884 teaches the art of precompounding the polyamide with polyesters to create a concentrate that can be diluted with a polyester and still yield the desired properties.

U.S. Patent No. 5,650,469 discloses the use of PET manufactured from purified terephthalic acid, PTA, rather than dimethyl terephthalate, DMT, to achieve better color in the final PET/polyamide blend.

In view of the above, the objective of the present invention is to develop the system which yields a product having reduced levels of less AA and improved color. Another object of the invention Is to provide polyester/polyamide blends that exhibit superior color for various applications.

BRIEF SUMMARY OF THE INVENTION

The present invention provides polyester blends comprising polyamides having at least one terminal acid group. The polyester/polyamide blends of the present invention display color that is much less yellow than polyester/polyamide blends of the prior art and desirably low levels of AA.

The present invention comprises polyester blend composition having improved color comprising:
(A) about 99.98 to about 95 weight percent of a polyester which comprises
  (1) a dicarboxylic acid component comprising repeat units from at least 85 mole percent terephthalic acid; and
  (2) a diol component repeat units from at least 85 mole percent ethylene glycol, based on 100 mole percent dicarboxlic acid and 100 mole percent diol; and
(B) a polyamide wherein at least 50% of said polyamide's end groups are acid groups.

The present invention also comprises polyester blend composition having improved color comprising:
(A) 99.96 to 90 weight percent of a polyester which comprises
  (1) a dicarboxylic acid component comprising repeat units from at least 85 mole percent terephthalic acid; and
  (2) a diol component repeat units from at least 85 mole percent ethylene glycol, based on 100 mole percent dicarboxlic acid and 100 mole percent diol;
(B) a polyamide wherein at least 50% of said polyamide's end groups are acid groups; and
(C) a polyamide having amino end groups.

DETAILED DESCRIPTION OF THE INVENTION

The present invention relates to a blend of polyester and polyamide wherein at least 50% of said polyamide's end groups are acid groups, which exhibits surprisingly low color while maintaining a low level of residual M. Acid group terminated polyamides can be further added into blends of polyester and amino terminated polyamide. The composition of the blends can be manipulated depending on the desired application. For applications that demand improved color over the current art while maintaining the current levels of acetaldehyde reduction, the compositions of the present inventions are of paramount interest. Alternatively, the present invention can be used where the application demands a nearly colorless product but can tolerate moderate levels of AA. The present invention also can be expanded to any application that utilizes polyester/polyamide blends and requires less color regardless of the molecular weight of the polyamide or polyester.

The desired level of AA and color properties are achieved when a critical amount of acid group terminated polyamide is blended with a PET alone, or blended with the mixture of PET and amino terminated polyamides. The blend of the acid terminated polyamide and polyester provides articles with even greater improved color over the current art while maintaining some level of AA reduction. It is anticipated that the same results would be realized if the blend was achieved by means of precompounding the blends, as disclosed in U.S. Pat. No. 5,340,884.

The polyester (A), of the present invention is selected from polyethylene terephthalate (PET), polyethylene naphthalenedicarboxylate (PEN) or copolyesters thereof. The acid component of polyester (A) contains repeat units from at least about 80 mole percent terephthalic acid, naphthlenedicarboxylic acid or mixtures thereof and at least about 85 mole percent ethylene glycol, based on 100 mole percent dicarboxylic acid and 100 mole percent diol.

The dicarboxylic acid component of the polyester may optionally be modified with up to about 20 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid. sebacic acid, and the like. Examples of dicarboxylic acids to be included with naphthalenedicarboxylic acid are: terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from two or more of the above dicarboxylic acids.

In addition, the glycol component (A)(2), may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,4-cyclohexanedimethanol, propane-1,3-diol. butane-1,4-diol, pentane-1,5-diol, hexane-1.6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1, 1, 3, 3-tetramethyl-cyclobutane, 2,2-bis-(3-hydroxyethoxyphenyl)-propane, and 2,2-bis-(4-hydroxypropoxyphenyl)-propane. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art. Preferably the carrier and base resins of the present invention should have molecular weights which are sufficient to insure that bottles may be formed from the resin. More preferably the resins have I.V. which are between about 0.60 and about 1.3 dl/gm, as determined in a 70:30 phenol:trichloroethane cosolvent at 25° C.

The PET and PEN based polyesters of the present invention can be prepared by conventional polycondensation procedures well known in the art. Such processes include direct condensation of the dicarboxylic acid(s) with the diol(s). The polyesters may also be subjected to solid state polymerization methods.

In the composition of the present invention, the polyester can be present in an amount of about 99.98 to about 95 weight percent when the polyester alone is blended with the acid terminated polyamide. The polyester can be present in an amount of about 99.96 to about 90 weight percent when the polyester is blended with the mixture containing the acid terminated polyamide and amino terminated polyamide.

Another component of the present invention is an acid terminated polyamide, which is capable of decreasing the color while maintaining the low level of AA. As used in the present invention the term "acid terminated polyamide" means polyamides having at least 50% of the total end groups as acid groups. This does not mean that every polyamide must have at least one acid end, merely that at least half of all the end groups are acid groups. In some embodiments of the present invention it is preferable to use fully acid terminated polyamides (all end groups are acid groups). The terminal acid group concentration in the acid terminated polyamides depends on the molecular weight or I.V. of the polyamide. For example, higher molecular weight polyamide will have fewer end groups, and therefor, a lower concentration of terminal acid group per gram of polyamide. The neat terminal acid polyamides have the highest concentration of the terminal acid groups and thus could be diluted with the addition of the terminal amino group polyamide. Polyamides having terminal acid groups should contain terminal acid groups at a concentration of about 0.1 to about 0.6 milli-equivalents per gram of polyamide, preferably from about 0.23 to about 0.42 milli-equivalents per gram of polyamide.

In the present invention, polyamides that display a melting point below about 300° C. can be used as the terminal acid group polyamide. It is preferred to use the polyamides with the melting point less than about 275° C. and glass transition temperature greater than about 25° C. The polyamides have an I.V. between about 0.3 dL/g and about 1.0 dL/g. Preferably the I.V. of polyamides is less than about 0.5 dL/g to reduce the haze in the bottle or film.

Preferably said polyamide is selected from the group consisting of low molecular weight partially aromatic polyamides having a number average molecular weight of less than 15,000 and low molecular weight aliphatic polyamides having a number average molecular weight of less than 7,000. Although wholly aromatic polyamides are not suitable since they would be liquid crystalline, the mixture of diamine-diacid complex which yields melting point less than about 300° C. can be used for this invention.

Combinations of such polyamides are also included within the scope of the invention. Partially aromatic polyamides comprise amide linkages between at least one aromatic ring and at least one nonaromatic species.

Wholly aromatic polyamides comprise in the molecule chain at least 70 mole % of structural units derived from m-xylene diamine or a xylylene diamine mixture comprising m-xylylene diamine and up to 30% of p-xylylene diamine and an αε-aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

The acid terminated polyamide can be blended with the polyester in an amount of about 0.02 to about 5.0 weight percent based on the total amount of the composition. A more preferred range is about 0.05 to about 2.0 weight percent, based on the total amount of the composition, and most preferably about 0.05 to about 1.0 weight percent.

In the composition of polyester, acid terminated polyamide and amino terminated polyamide, the acid terminated polyamide and the amino terminated polyamide can each be present in an amount of about 0.02 to about 5.0 weight percent based on the total amount of the composition. A more preferred range is about 0.05 to about 2.0 weight percent for each acid/amino terminated polyamide, based on the total amount of the composition, and most preferably about 0.05 to about 1.0 weight percent. The ratio of acid terminated polyamide to amino terminated polyamide should be at least 1:1 in the above said composition.

Low molecular weight polyamides formed from isophthalic acid, terephthalic acid, cyclohexanedicarboxylic acid, meta- or para-xylylene diamine, 1,3- or 1,4-cyclohexane (bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred low molecular weight partially aromatic polyamides include: poly(m-xylylene adipamide), poly (hexamethylene isophthalamide), poly(hexamethylene adipamide-co-isophthalamide), poly(hexamethylene adipamide-co-terephthalamide), and poly(hexamethylene isophthalamide-co-terephthalamide). The most preferred low molecular weight partially aromatic polyamide is poly (m-xylylene adipamide) having a number average molecular weight of about 4,000 to about 7,000 and an inherent viscosity of about 0.3 to about 0.6 dL/g.

Preferred low molecular weight aliphatic polyamides include poly(hexamethylene adipamide) and poly (caprolactam). The most preferred low molecular weight aliphatic polyamide is poly(hexamethylene adipamide) having a number average molecular weight of about 3,000 to about 6,000 and an inherent viscosity of 0.4 to 0.9 dL/g. Low molecular weight partially aromatic polyamides, are preferred over the aliphatic polyamides where clarity and dispersibility are crucial.

Preferred low molecular weight aliphatic polyamides include polycapramide (nylon 6), poly-w-aminoheptanoic acid (nylon 7), poly-w-aminonanoic acid (nylon 9), polyundecane-amide (nylon 11), polyaurylactam (nylon 12), polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6). polydecamethylene-adipamide (nylon 10,6), polydodecamethylene-adipamide (nylon 12,6) and polydodecamethylene-sebacamide (nylon 12.8).

The low molecular weight polyamides are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80 to 120° C., until the ester is converted to an amide. The mixture is then heated to the polymerization temperature. In the case of polycaprolactam, either caprolactam or 6-aminocaproic acid can be used as a starting material and the polymerization may be catalyzed by the addition of adipic acid/hexamethylene diamine salt which results in a nylon 6/66 copolymer. When the diacid-diamine complex is used, the mixture is heated to melting and stirred until equilibration.

The molecular weight is controlled by the diacid-diamine ratio. An excess of diamine produces a higher concentration of terminal amino groups. If the diacid-diamine complex is prepared in a separate step, excess diamine is added prior to the polymerization. The polymerization can be carried out either at atmospheric pressure or at elevated pressures.

The polyamide having a terminal acid group is generally prepared in the same manner as described above, however, excess diacid is used.

The process for preparing the polyester/polyamide blends of the present invention involves preparing the polyester and the polyamide having a terminal acid group as previously described. The mixture of dried materials of polyester and polyamide is then melt blended in a single or twin screw extruder. It was observed that the blends of PET and polyamide processed on screws with more mixing sections (twin screw extruder) yielded better AA reduction and color as compared to screws with less mixing sections. Melt temperatures must be at least as high as the melting point of the polyester and are typically in the range of 260–310° C. Preferably, the melt compounding temperature is maintained as low as possible within said range. After completion of the melt compounding, the extrudate is withdrawn in strand form, and recovered via conventional means, such as, but not limited to pelletizing. Instead of melt compounding. the polyester and polyamide may be dry-blended and heat-molded or draw-formed into plastic articles via methods which are known in the art, such as stretch blow molding, extrusion blow molding, extrusion molding and thermoforming.

The acid terminated polyamide can be added in the late stages of polyester manufacture. For example, the acid terminated polyamide can be blended with the molten polyester as it is removed from the polycondensation reactor, before it is pelletized. This method, however, is not desirable if the polyester/polyamide blend will be subjected to solid state polymerization since undesirable color and/or haze may develop during extended time at elevated temperatures.

The blends of this invention serve as excellent starting materials for the production of moldings of all types by extrusion or injection molding.

Specific applications include various packaging applications such as thermoformed or injection molded trays, lids and cups, injection stretch blow-molded bottles, film and sheet; extrusion blow-molded bottles and multilayer articles. Examples of package contents include, but are not limited to food, beverages, and cosmetics.

Many other ingredients can be added to the compositions of the present invention to enhance the performance properties of the blends. For example, crystallization aids, impact modifiers, surface lubricants, denesting agents, stabilizers, antioxidants, ultraviolet light absorbing agents, metal deactivators, colorants such as titanium dioxide and carbon black, nucleating agents such as polyethylene and polypropylene, phosphate stabilizers, fillers, barrier enhancing platelet particles and the like, can be included herein. All of these additives and the use thereof are well known in the art and do not require extensive discussions. Therefore, only a limited number will be referred to, it being understood that any of these compounds can be used so long as they do not hinder the present invention from accomplishing its objectives.

Because the present invention of the polyester blends produces superior color, dyes are either not required for masking purposes or required in lesser amounts. However, should color be desirable colorants may be added. The colorant can be added to either component of the blend during polymerization or added directly to the blend during compounding. If added during blending, the colorant can be added either in pure form or as a concentrate. The amount of a colorant depends on its absorptivity and the desired color for the particular application. A preferred colorant is 1-cyano-6-(4-(2-hydroxyethyl)anilino)-3-methyl-3H-dibenzo (F,I,J)-isoquinoline-2,7-dione used in an amount from about 2 to about 15 ppm.

Desirable additives also include impact modifiers and antioxidants. Examples of typical commercially available impact modifiers well-known in the art and useful in this invention include ethylene/propylene terpolymers, styrene based block copolymers, and various acrylic core/shell type impact modifiers. The impact modifiers may be used in conventional amounts from 0.1 to 25 weight percent of the overall composition and preferably in amounts from 0.1 to 10 weight percent of the composition. Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included.

It has been unexpectedly discovered that acid terminated polyamides yield surprisingly low color in resulting polyester blends while maintaining significant levels of AA reduction. The color is improved significantly when 0.1% acid terminated polyamide is added to the mixture containing a PET and 0.1% amino terminated polyamide, without adversely affecting the amount of the AA reduction. Furthermore, the extremely low color achieved by adding a small amount of acid terminated polyamide to a polyester is not attainable in the prior art of polyester/polyamide blends.

This is particularly surprising since the addition of polyamide in general is known to deleteriously affect the color of the resultant polyesters.

This invention can be further illustrated by the following examples of preferred embodiments thereof, although it will be understood that these examples are included for purposes of illustration and are not intended to limit the scope of the invention unless otherwise specifically indicated.

EXAMPLES

Preparation of Amino Terminated Polyamide

A mixture of 58.4g (0.4 mole) of adipic acid units and 71.5g of distilled water were placed in a 500 ml flask, then purged about 60 minutes with nitrogen. Quickly. 57.75g (0.424 mole, 6% molar excess) of m-xylylenediamine was added to the flask. The flask was equipped with an inlet for nitrogen, a metal stirrer, and a short distillation column. Then the flask was placed in a Belmont metal bath already heated to 115° C. for 30 minutes. The temperature was then raised progressively to 275° C. over 25 minutes. After being heated at 275° C. for 30 minutes, a low melt viscosity, clear polyamide was obtained. The polymer had an inherent viscosity of 0.64 (PM-95), amino end groups of 0.13 meq/g, COOH end groups of 0.045 meq/g and a melting endotherm of 241° C.

Preparation of Acid Terminated Polyamide

A mixture of 178.7g (1.224 moles, 2% molar excess) of adipic acid units and 210 g of distilled water were placed in a 500 ml flask, then purged about 30 minutes with argon. Quickly. 163.4 g (1.2 moles) of m-xylylenediamine was added to the flask. The flask was equipped with an inlet for nitrogen, a metal stirrer, and a short distillation column. The flask was then placed in a Belmont metal bath already heated to 110° C. for 30 minutes. The temperature was then raised progressively to 275° C. over 60 minutes. After being heated at 275° C. for 30 minutes, a low melt viscosity, clear polyamide was obtained. The polymer had an inherent viscosity of 0.458 (PM-95), amino end groups of 0.01 meq/g, COOH end groups of 0.22 meq/g and a melting endotherm of 238° C.

Testing Procedures

Residual AA and pellet color were both measured in every example. Pellets were stored at −40° C. until they were ground to a 20 mesh or finer powder. A sample tube was loaded with 0.5 g of powder and quickly sealed. The sample was then analyzed by using dynamic headspace gas chromatographic analysis using a Hewlett-Packard 5890 Gas Chromatograph with a Perkin Elmer Automatic Thermal Desorption ATD-50 as the injection system. The sample was heated to 140° C. for ten minutes so that the AA could desorb more quickly.

Color was measured by using a Hunter Color Lab instrument and following ASTM D2244. The CIELAB color scale was used. L* is a measure of brightness, a* is a measure of redness (+) or greenness (−) and b* is a measure of yellowness (+) or blueness (−).

EXAMPLES 1–7

In the following examples, 9921from Eastman Chemical Co. a DMT based PET copolyester was dried at 150° C. overnight in a Conair dehumidifying dryer. The blends were prepared by dry blending the materials after each material was carefully weighed. The mixture was then melt blended in a 1" Brabender single screw extruder equipped with an Egan mixing screw, extruded into a single strand, quenched in a water bath. and pelletized. Extruder set conditions were: 100 rpm screw speed. 250° C. first zone temperature, 285° C. second, third, and fourth zone temperatures.

The pellets were then stored in a freezer at −40° C. overnight and then tested for residual AA and CIELAB Color.

Example 1 was the PET control sample with no polyamide added. Examples 2, 3, and 4 contained 0.1, 0.5, and 1.0 weight percent, respectively, amino terminated polyamide. Examples 5, 6, and 7 contained 0. 1, 0.5, and 1.0 weight percent, respectively, acid terminated polyamide. Results are summarized in Table. AA reduction was calculated with respect to Example 1. Increase in b* (yellow/blue index) was calculated with respect to Example 1 since it was desired to obtain a sample with no additional color over the PET control.

TABLE I

DMT Based PET/Polyamide Blends: Melt Blended on Single Screw Extruder

| Ex | Polyamide Ends | Polyamide (wt. %) | Resid. AA (ppm) | AA Reductn (%) | b* Color (units) | Increase in b* (units) |
|---|---|---|---|---|---|---|
| 1 | — | 0.0 | 3.84 | — | 0.93 | — |
| 2 | amino | 0.1 | 1.36 | 64.6 | 5.20 | 4.27 |
| 3 | amino | 0.5 | 0.45 | 88.3 | 8.69 | 7.76 |
| 4 | amino | 1.0 | 0.41 | 89.3 | 9.94 | 9.01 |
| 5 | acid | 0.1 | 3.32 | 13.5 | 1.48 | 0.55 |
| 6 | acid | 0.5 | 2.62 | 31.8 | 2.50 | 1.57 |
| 7 | acid | 1.0 | 2.41 | 37.2 | 2.74 | 1.81 |

The polyester/polyamide blends of examples 2, 3, and 4 display which is significantly and unacceptably yellow. Examples 5 through 7 products with some reduction in AA, but unexpected drastic ovements in color.

Figure 1:
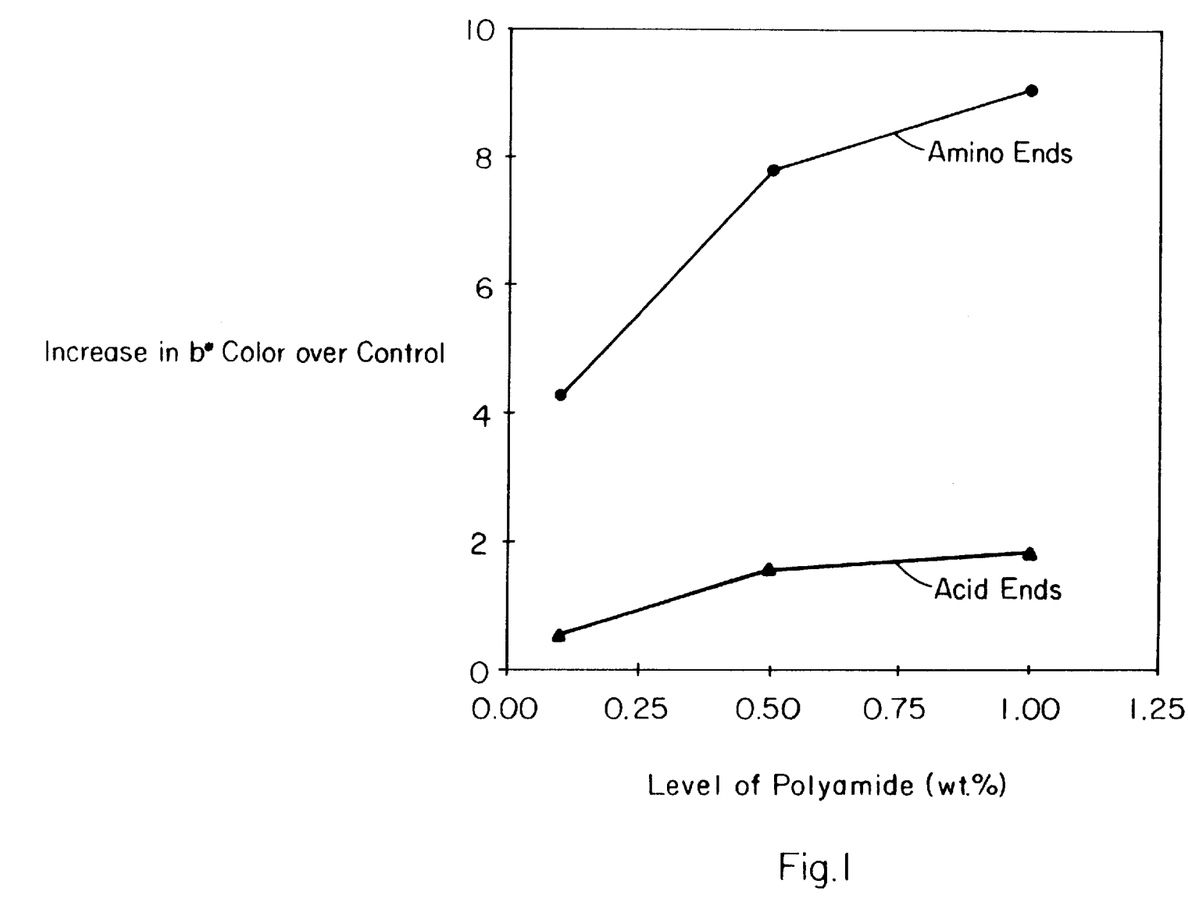
FIGS. 1 and 2 are graphs showing the increase in blends including b* as a function of the weight % of polyamide for amino terminated and acid terminated polyamides.

FIG. 1 illustrates the drastic differences in color between the two ems. The blend containing the acid terminated polyamide has significantly less color than the blend containing the polyamide having only terminal amino groups.

EXAMPLES 8–14

In the following examples, 9921W from Eastman Chemical Co. PTA based PET copolyester was dried at 150° C. overnight in a Conair midifying dryer. The blends were prepared by dry blending the materials after each material was carefully weighed. The mixture was then blended in a 1" Brabender single screw extruder equipped with an Egan mixing screw, extruded into a single strand, quenched in a water bath. and pelletized. Extruder set conditions were: 100 rpm screw speed, 250° C. first zone temperature, 285° C. second, third, and fourth zone temperatures. The pellets were then stored in a freezer at −40° C. overnight and then tested for residual AA and CIELAB Color.

Example 8 was the PET control sample with no polyamide added. Examples 9, 10, and 11 contained 0.1, 0.5, and 1.0 weight percent, respectively, amino terminated polyamide. Examples 12,13, and 14 contained 0.1, 0.5, and 1.0 weight percent, respectively, acid terminated polyamide. Results are summarized in Table II. AA reduction was calculated as compared to Example 8. Increase in b* color was calculated as compared to Example 8 since it is desired to obtain a sample with no additional color over the PET control.

TABLE II

PTA Based PET/Polyamide Blends: Melt Blended on Single Screw Extruder

| Ex | Polyamide Ends | Polyamide (wt. %) | Resid. AA (ppm) | AA Reductn (%) | b* Color (units) | Increase in b* (units) |
|---|---|---|---|---|---|---|
| 8 | — | 0.0 | 3.77 | — | 1.04 | — |
| 9 | amino | 0.1 | 0.95 | 74.8 | 3.73 | 2.69 |
| 10 | amino | 0.5 | 0.38 | 89.9 | 6.46 | 5.42 |
| 11 | amino | 1.0 | 0.37 | 90.2 | 7.00 | 5.96 |
| 12 | acid | 0.1 | 2.75 | 27.1 | 1.54 | 0.50 |
| 13 | acid | 0.5 | 2.10 | 44.3 | 1.96 | 0.92 |
| 14 | acid | 1.0 | 1.80 | 52.3 | 2.23 | 1.19 |

The blends of examples 9, 10, and 11 display significant reductions of AA, but only with corresponding increases in unacceptably yellow color. Examples 12 through 14 show products with some reduction in AA. but with unexpected drastic improvements in color. Comparing examples 10 and 13, which had the same amount of polyamide (0.5 wt %), the efficiency of M reduction for example 13 is about half that of example 10, but the increase in b* units is only 0.92, which is less than 1/5 of that of example 10.

Figure 2:
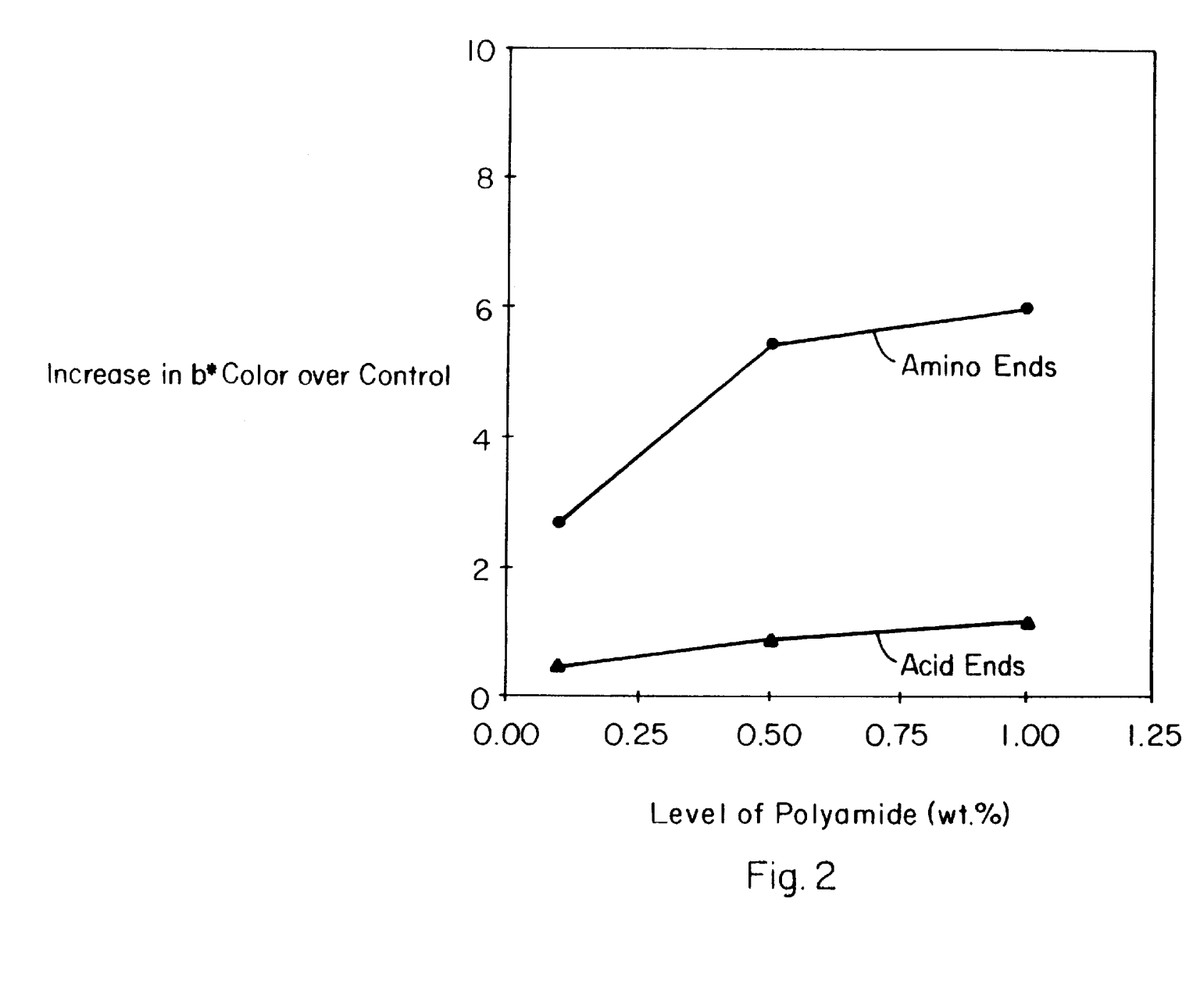

FIG. 2 illustrates the drastic differences in color between the two systems. The blend containing the acid terminated polyamide has significantly less color than the blend containing the amino terminated polyamide.

Figure 3:
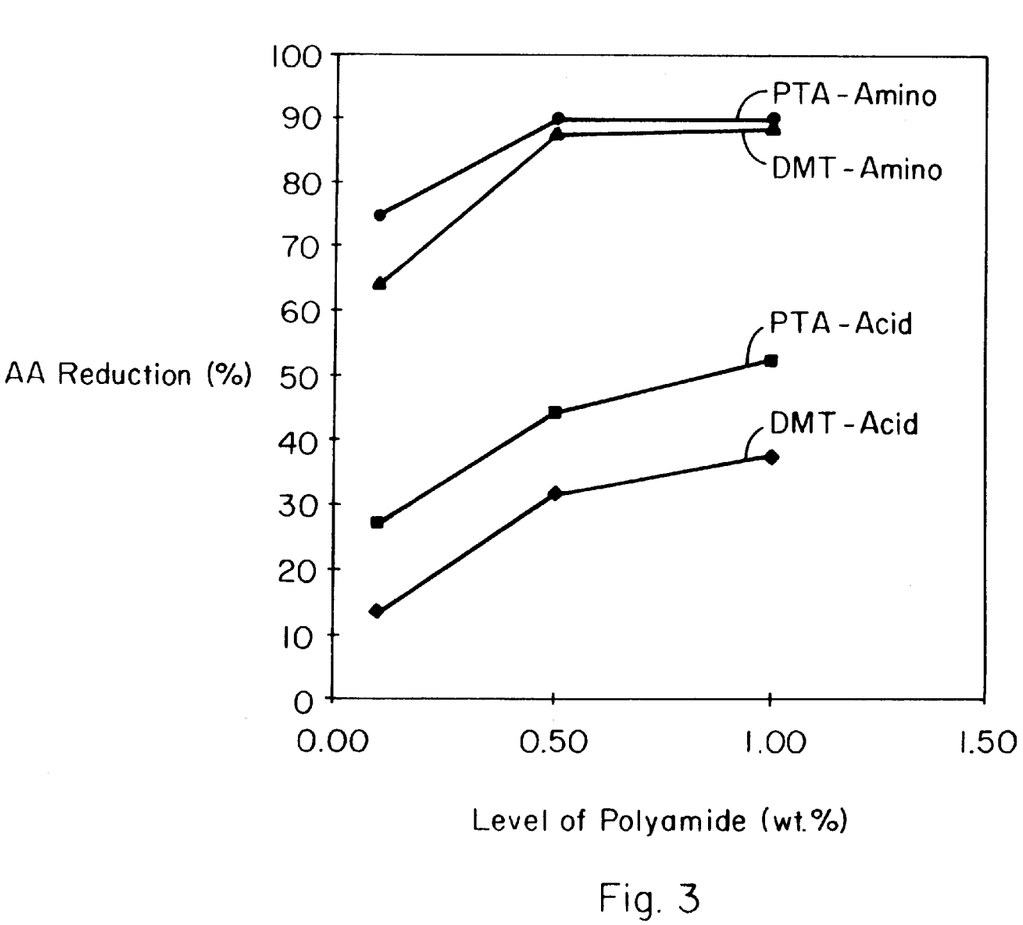
FIG. 3 is a graph showing AA reduction as a function of amount of acide and amino terminal poly amide in DMT and PTA based PET.

Tables I and II and the Figures attached hereto clearly show the an unexpectedness of the results when the present invention is utilized. FIG. 3 illustrates the difference in AA reductions of the four different systems. The difference in AA reduction between the PTA based PET/acid terminated polyamide and the DMT based PET/acid terminated polyamide were also unexpected. In the blends containing the amino terminated polyamides, very little additional reduction is achieved above about 0.5 wt % polyamide. However, b* continues to degrade as the amount of amino terminated polyamides is increased. Surprisingly, the improvement in AA reduction displayed by the acid terminated polyamides continues at concentrations above 0.5, (from 32 to 37 and 44 to 52 for Examples 6,7 and 13, 14, respectively). Moreover, the worst b* for an acid terminated polyamide (1.19, Example 14) is better than the best b* (2.69) for an amino terminated polyamide (Example 9). These results were very surprising

EXAMPLES 15–20

In the following examples, a PET copolyester, Eastapak PET 9921W, (Eastman Chemical Company) was dried at 140° C. overnight in a Conair dehumidifying dryer. The polyamides were dried in a convection oven at 65° C. overnight. The blends were prepared by dry blending the materials after each material was carefully weighed; all blends in these examples comprised of 98 weight percent PET and 2 weight percent polyamide. The dried blends were fed into a 19mm APV twin screw extruder, equipped with screws containing either four mixing sections or eight mixing sections, at a feed rate of 6.4 lb./hr, extruded into a single strand quenched in a water bath, and pelletized. Set conditions on the extruder were: 300 rpm screw speed, and 275° C. zone temperatures. The pellets were stored in a freezer at −40° C. overnight and then tested for residual AA and CIELAB Color. Examples 15 through 20 are summarized in Table III.

TABLE III

PET/Polyamide Blends: Melt Blended on a Twin Screw Extruder

| Ex. | Polyamide Ends | Mixing Sections | Residual AA (ppm) | AA Reduction (%) | b* (units) | Increase in b* (units) |
|---|---|---|---|---|---|---|
| 15 | — | 4 | 3.27 | — | 2.90 | — |
| 16 | amino | 4 | 0.39 | 88.1 | 9.30 | 6.40 |
| 17 | acid | 4 | 2.16 | 33.9 | 4.61 | 1.71 |
| 18 | — | 8 | 5.14 | — | 4.01 | — |
| 19 | amino | 8 | 0.39 | 92.4 | 9.08 | 5.07 |
| 20 | acid | 8 | 2.76 | 46.3 | 4.29 | 0.28 |

Examples 15 through 17 show that given the same blend ratio and same processing conditions, the blend containing the acid terminated polyamide has much better color (less yellow) than the blend containing the amino terminated polyamide.

Examples 18 through 20 also show that given the same blend ratio and the same processing conditions, the blend containing the acid terminated polyamide had much better color than the blend containing the amino terminated polyamide. Furthermore, by comparing Example 18 to Example 15, it is shown that the additional mixing sections generated more AA and more color in the PET. However. Examples 19 and 20 show that the blends of PET and polyamide processed on screws with more mixing sections showed better AA reduction and color as compared to Examples 16 and 17, respectively.

Figure 4:
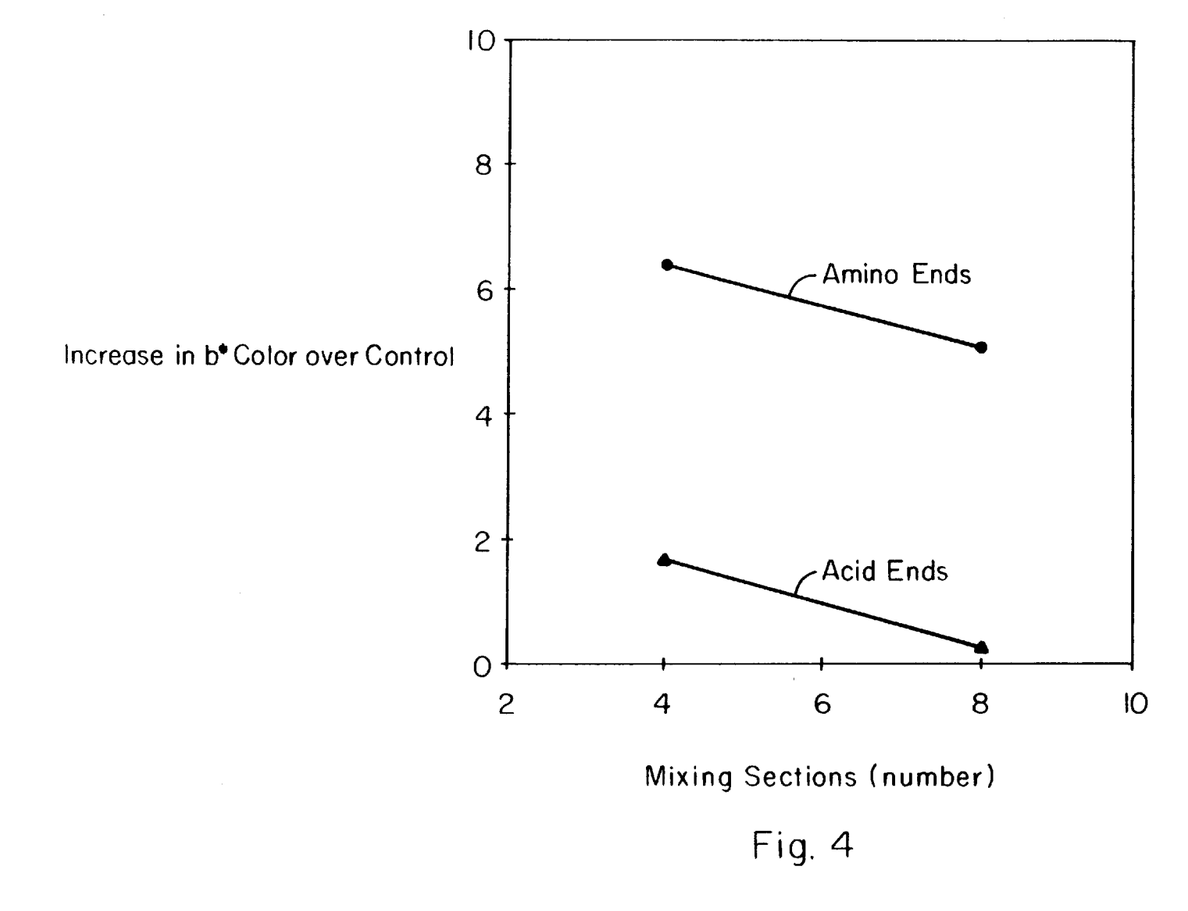
FIG. 4 is a graph showing the color (b*) as a function of number of mixing sections for PET blends containing acid and amino terminal polyamides.

FIG. 4 illustrates Examples 15 through 20. Unexpectedly, the colors of both the polyamide having a terminal acid group/PET blends and the polyamide having a terminal amino group/PET blends were improved by changing the design of the extruder screws.

EXAMPLES 21–22

In the following examples, a DMT based PET 9921 (Eastman Chemical Co.) was dried at 150° C. overnight in a Conair dehumidifying dryer. The blends were prepared by dry blending the PET and polyamides, in the amounts shown in Table IV, below after each material was carefully weighed. The mixture was then melt blended in a 1" Brabender single screw extruder equipped with a Egan mixing screw, extruded into a single strand, quenched in a water bath, and pelletized. Extruder set conditions were: 100 rpm screw speed, 250° C. first zone temperature, 285° C. second, third, and fourth zone temperatures. The pellets were then stored in a freezer at −40° C. overnight and then tested for residual AA and CIELAB Color.

Table IV lists these examples with comparative examples previously stated.

TABLE IV

DMT Based PET/Polyamide Blends: Melt Blended on Single Screw Extruder

| Ex. | Polyamide Ends | Polyamide (wt. %) | Residual AA (ppm) | AA Reductn (%) | b* (units) | Increase in b* (units) |
|---|---|---|---|---|---|---|
| 1 | — | 0.0 | 3.84 | — | 0.93 | — |
| 2 | amino | 0.1 | 1.36 | 64.6 | 5.20 | 4.27 |
| 5 | acid | 0.1 | 3.32 | 13.5 | 1.48 | 0.55 |
| 21 | amino/acid | 0.1/0.1 | 1.33 | 65.4 | 3.87 | 2.94 |
| 3 | amino | 0.5 | 0.45 | 88.3 | 8.69 | 7.76 |
| 6 | acid | 0.5 | 2.62 | 31.8 | 2.50 | 1.57 |
| 22 | amino/acid | 0.5/0.5 | 0.45 | 88.3 | 8.00 | 7.07 |
| 4 | amino | 1.0 | 0.41 | 89.3 | 9.94 | 9.01 |
| 7 | acid | 1.0 | 2.41 | 37.2 | 2.74 | 1.81 |

The mixed amino/acid terminated polyamide displayed AA reduction which was superior to the amino terminated polyamide (65 v. 64%) and color which was also significantly better (over 1 b* unit) than the amino terminated polyamide. This suggests that the addition of the polyamide having terminal acid groups improves the color of the system. Similarly, blend of example 22 containing amino/acid terminated polyamide at 0.5 wt % also displays an AA reductions which is the same as the amino terminated polyamide, with unexpectedly improved color. These examples also illustrate that, surprisingly, color is not additive in these PET/polyamide systems.

EXAMPLES 23–28

In the following examples, a PTA based PET (PET 9921W, Eastman Chemical Co.) was dried at 150° C. overnight in a Conair dehumidifying dryer. The blends were prepared by dry blending the materials after each material was carefully weighed. The mixture was then melt blended in a 1" Brabender single screw extruder equipped with an Egan mixing screw, extruded into a single strand, quenched in a water bath, and pelletized. Extruder set conditions were: 100 rpm screw speed, and 285° C. barrel zone temperatures. The pellets were then stored in a freezer at −40° C. overnight and then tested for residual AA and CIELAB Color.

Example 23 was the PET control sample with no polyamide added. Examples 24 through 28 were blends containing a total of 0.5 weight percent polyamide, with different ratios of terminal acid and amino groups. AA reduction and increase in color are referenced to the PET control in Example 23. Table V summarizes these examples.

TABLE V

PET/Polyamide Blends: Melt Blended on a Single Screw Extruder

| Ex. | Polyamide Ends | Polyamide (wt. %) | Residual AA (ppm) | AA Reductn (%) | b* (units) | Increase in b* (units) |
|---|---|---|---|---|---|---|
| 23 | — | — | 4.15 | — | 1.11 | — |
| 24 | acid/amino | 0.50/0.00 | 2.46 | 40.7 | 2.15 | 1.04 |
| 25 | acid/amino | 0.40/0.10 | 1.61 | 61.2 | 3.11 | 2.00 |
| 26 | acid/amino | 0.25/0.25 | 0.57 | 86.3 | 4.72 | 3.61 |
| 27 | acid/amino | 0.10/0.40 | 0.39 | 90.6 | 5.69 | 4.58 |
| 28 | acid/amino | 0.00/0.50 | 9.45 | 89.2 | 6.27 | 5.16 |

As in the DMT PET examples above, addition of acid terminated polyamide improved color without dramatically degrading AA reduction (compare Examples 27 and 27 to Example 28). Surprisingly, Example 26 had a high level of AA reduction, similar to EXAMPLES 27 and 28, but much less color.

EXAMPLES 29–34

In the following examples, a PTA based PET (PET 9921W, Eastman Chemical Co.) was dried at 150° C. overnight in a Conair dehumidifying dryer. The blends were prepared by dry blending the materials after each material was carefully weighed. The mixture was then melt blended in a 1" Brabender single screw extruder equipped with an Egan mixing screw, extruded into a single strand, quenched in a water bath, and pelletized. Extruder set conditions were: 100 rpm screw speed, and 285° C. barrel zone temperatures. The pellets were then stored in a freezer at −40° C. overnight and then tested for residual M and CIELAB Color.

Example 23 was the PET control sample with no polyamide added. Examples 29 through 34 were blends containing 0.25 weight percent polyamide having a terminal amino group with different levels of polyamide having a terminal acid group. AA reduction and increase in color are referenced to the PET control in Example 23. Table VI summarizes these examples. These examples again show that the addition of the polyamide having a terminal acid group reduces the color of the blend, while maintaining a high level of M reduction.

TABLE VI

PET/Polyamide Blends: Melt Blended on a Single Screw Extruder

| Ex. | Polyamide Ends | Polyamide (wt. %) | Residual AA (ppm) | AA Reductn (%) | b* (units) | Increase in b* (units) |
|---|---|---|---|---|---|---|
| 23 | — | — | 4.15 | — | 1.11 | — |
| 29 | Acid/amino | 0.00/0.25 | 0.52 | 87.5 | 5.40 | 4.29 |
| 30 | Acid/amino | 0.25/0.25 | 0.52 | 87.5 | 4.92 | 3.81 |
| 31 | Acid/amino | 0.50/0.25 | 0.67 | 83.9 | 4.56 | 3.45 |
| 32 | Acid/amino | 1.00/0.25 | 0.83 | 80.0 | 4.17 | 3.06 |
| 33 | Acid/amino | 1.50/0.25 | 0.93 | 77.6 | 4.17 | 3.06 |
| 34 | Acid/amino | 2.00/0.25 | 0.94 | 77.3 | 4.26 | 3.15 |

We claim:

1. A polyester blend having improved color comprising:
   (A) from about 99.98 to about 95 weight percent of a polyester which comprises
       (1) a dicarboxylic acid component comprising repeat units of at least 80 mole percent terephthalic acid, naphthalenedicarboxylic acid, or a mixture thereof; and
       (2) a diol component comprising repeat units of at least 85 mole percent ethylene glycol, based on 100 mole percent dicarboxylic acid and 100 mole percent diol; and
   (B) at least one acid terminated polyamide having at least 100% of its total end groups as acid groups, wherein the polyester blend has a b* value less than that of a polyester/polyamide blend having only an amino terminated polyamide.

2. The composition of claim 1 wherein said polyester is polyethylene terephthalate (PET).

3. The composition of claim 1 wherein said at least one acid terminated polyamide comprises terminal acid groups at a concentration of about 0.1 to about 0.6 milli-equivalents per gram of polyamide.

4. The composition of claim 1 wherein said at least one acid terminated polyamide comprises terminal acid groups at a concentration of about 0.23 to about 0.42 milli-equivalents per gram of polyamide.

5. The composition of claim 1 wherein said at least one acid terminated polyamide is selected from the group consisting of polyamides having a melting point below about 300° C., a glass transition temperature greater than 25° C. and an I.V. between about 0.3 dL/g and about 1.0 dL/g.

6. The composition of claim 1 wherein said at least one acid terminated polyamide is selected from the group consisting of low molecular weight partially aromatic polyamides having a number average molecular weight of less than 15,000, low molecular weight aliphatic polyamides having a number average molecular weight of less than 7,000 and compatible wholly aromatic polyamides and mixtures thereof.

7. The composition of claim 1 wherein said at least one acid terminated polyamide is present in an amount about 0.02 to about 5.0 weight percent based on the total amount of the composition.

8. The composition of claim 1 wherein said at least one acid terminated polyamide is present in an amount about 0.05 to about 2.0 weight percent based on the total amount of the composition.

9. The composition of claim 1 wherein said at least one acid terminated polyamide is present in an amount about 0.05 to about 1.0 weight percent based on the total amount of the composition.

10. The composition of claim 1 wherein said dicarboxylic acid component comprises repeat units of at least 80 mole percent terephthalic acid.

11. A polyester blend having improved color comprising:
    (A) from about 99.98 to about 95 weight percent of a polyester which comprises
        (1) a dicarboxylic acid component comprising repeat units of at least 80 mole percent terephthalic acid, naphthalenedicarboxylic acid, or a mixture thereof; and
        (2) a diol component comprising repeat units of at least 85 mole percent ethylene glycol, based on 100 mole percent dicarboxylic acid and 100 mole percent diol; and
    (B) at least one acid terminated polyamide having at least 100% of its total end groups as acid groups, and
    (C) at least one amino terminated polyamide, wherein the polyester blend has a b* value less than that of a polyester/polyamide blend having only an amino terminated polyamide.

12. The composition of claim 11 wherein said polyester is polyethylene terephthalate (PET).

13. The composition of claim 11 wherein said at least one acid terminated polyamide comprises terminal acid groups at a concentration of about 0.1 to about 0.6 milli-equivalents per gram of polyamide.

14. The composition of claim 11 wherein said at least one acid terminated polyamide comprises terminal acid groups at a concentration of about 0.23 to about 0.42 milli-equivalents per gram of polyamide.

15. The composition of claim 11 wherein said at least one acid terminated polyamide and said amino terminated polyamide are each present in an amount about 0.02 to about 5.0 weight percent based on the total amount of the composition.

16. The composition of claim 11 wherein said at least one acid terminated polyamide and said amino terminated polyamide are each present in an amount about 0.05 to about 2.0 weight percent based on the total amount of the composition.

17. The composition of claim 11 wherein said at least one acid terminated polyamide and said amino terminated polyamide are each present in an amount about 0.05 to about 1.0 weight percent based on the total amount of the composition.

18. The composition of claim 11 wherein said at least one acid terminated polyamide and said amino terminated polyamide are present in a ratio of at least 1:1.

19. The composition of claim 11 wherein said dicarboxylic acid component comprises repeat units of at least 80 mole percent terephthalic acid.

20. A process comprising blending:
    (A) from about 99.98 to about 95 weight percent of a polyester which comprises
        (1) a dicarboxylic acid component comprising repeat units of at least 85 mole percent terephthalic acid; and
        (2) a diol component comprising repeat units of at least 85 mole percent ethylene glycol, based on 100 mole percent dicarboxylic acid and 100 mole percent diol; and
    (B) at least one acid terminated polyamide having at least 100% of its total end groups as acid groups; thereby providing a polyester blend, wherein the polyester blend has a b* value less than that of a polyester/polyamide blend having only an amino terminated polyamide.

21. An article prepared by the process of claim 20.

22. A process comprising blending:
    (A) from about 99.96 to about 90 weight percent of a polyester which comprises
        (1) a dicarboxylic acid component comprising repeat units of at least 85 mole percent terephthalic acid; and
        (2) a diol component comprising repeat units of at least 85 mole percent ethylene glycol, based on 100 mole percent dicarboxylic acid and 100 mole percent diol; and
    (B) at least one acid terminated polyamide having at least 100% of its total end groups as acid groups; and (C) an amino terminated polyamide, thereby providing a polyester blend, wherein the polyester blend has a b* value less than that of a polyester/polyamide blend having only an amino terminated polyamide.

23. An article prepared by the process of claim 22.

* * * * *